(12) United States Patent
Chou et al.

(10) Patent No.: US 8,930,712 B1
(45) Date of Patent: Jan. 6, 2015

(54) METRIC OBFUSCATION SYSTEM

(75) Inventors: Linus Chou, San Francisco, CA (US);
Jacob B Matthews, Chicago, IL (US);
James H. Koh, Chicago, IL (US)

(73) Assignee: Google Inc., Mountain View, CA (US)

( * ) Notice: Subject to any disclaimer, the term of this patent is extended or adjusted under 35 U.S.C. 154(b) by 225 days.

(21) Appl. No.: 13/548,112

(22) Filed: Jul. 12, 2012

(51) Int. Cl.
*H04L 29/06* (2006.01)

(52) U.S. Cl.
USPC ............................................ 713/189; 380/46

(58) Field of Classification Search
CPC . G06F 2221/2107; G06F 21/72; G06F 7/588;
G06F 7/582; G06F 7/58; G06F 12/1408;
H04L 9/0869; H04L 9/0662; H04L 9/0656;
H04L 2209/08; H04L 9/0872
USPC ............... 713/150, 168, 189, 193; 380/44, 46
See application file for complete search history.

(56) References Cited

U.S. PATENT DOCUMENTS

| | | | | |
|---|---|---|---|---|
| 2008/0123842 | A1* | 5/2008 | Pohja | 380/44 |
| 2009/0132275 | A1* | 5/2009 | Jung et al. | 705/2 |
| 2010/0199098 | A1* | 8/2010 | King | 713/182 |
| 2012/0030165 | A1* | 2/2012 | Guirguis et al. | 707/607 |
| 2012/0255030 | A1* | 10/2012 | Matsuo | 726/26 |
| 2013/0191213 | A1* | 7/2013 | Beck et al. | 705/14.53 |

* cited by examiner

*Primary Examiner* — Joseph P Hirl
*Assistant Examiner* — John B King
(74) *Attorney, Agent, or Firm* — McDermott Will & Emery LLP

(57) ABSTRACT

A system for metric obfuscation may include one or more processors and memory. The one or more processors may receive a dataset comprising a plurality of metrics that relate to user demographic information and may generate a seed based at least in part on the dataset. The one or more processors may initialize a pseudorandom number generator with the seed and may generate a plurality of pseudorandom numbers using the pseudo-random number generator. The one or more processors may generate a plurality of obfuscated metrics corresponding to the plurality of metrics, wherein each of the plurality of obfuscated metrics is generated at least in part based on a corresponding metric of the plurality of metrics and a corresponding pseudorandom number of the plurality of pseudorandom numbers. The one or more processors may provide the plurality of obfuscated metrics.

18 Claims, 5 Drawing Sheets

METRIC OBFUSCATION SYSTEM

TECHNICAL FIELD

The present description relates generally to obfuscation, and more particularly, but not exclusively, to a metric obfuscation system.

BACKGROUND

In online systems it may be desirable to provide a viewer with metrics that correspond to user demographic information. However, in view of privacy concerns it may be desirable to provide any metrics that correspond to user demographic information such that the demographic information of an individual user, or of groups of users, is not determinable from the metrics.

SUMMARY

The disclosed subject matter relates to a computer-implemented method for metric obfuscation. The method may include receiving, using one or more computing devices and at periodic intervals, a plurality of metrics related to user demographic information. The method may further include generating, using the one or more computing devices and at each of the periodic intervals, a seed from the plurality of metrics, wherein the generated seed changes across the periodic intervals exclusively when any of the plurality of metrics changes across the periodic intervals. The method may further include initializing, using the one or more computing devices and at each of the periodic intervals, a pseudo-random number generator with the seed. The method may further include generating, using the one or more computing devices and at each of the periodic intervals, a plurality of pseudorandom numbers using the pseudorandom number generator. The method may further include generating, using the one or more computing devices and at each of the periodic intervals, a plurality of obfuscated metrics corresponding to the plurality of metrics, wherein each of the plurality of obfuscated metrics is generated at least in part based on a corresponding metric of the plurality of metrics and a corresponding pseudorandom number of the plurality of pseudorandom numbers. The method may further include providing, using the one or more computing devices and at each of the periodic intervals, the plurality of obfuscated metrics.

In another aspect, a computer-implemented method for metric obfuscation may include receiving, using one or more computing devices, a first dataset comprising a first plurality of metrics. The method may further include generating, using the one or more computing devices, a first seed based at least in part on the first dataset. The method may further include initializing, using the one or more computing devices, a pseudorandom number generator with the first seed. The method may further include generating, using the one or more computing devices, a first plurality of pseudorandom numbers using the pseudo-random number generator. The method may further include generating, using the one or more computing devices, a first plurality of obfuscated metrics corresponding to the first plurality of metrics, wherein each of the first plurality of obfuscated metrics is generated at least in part based on a corresponding metric of the first plurality of metrics and a corresponding pseudorandom number of the plurality of pseudorandom numbers. The method may further include providing, using the one or more computing devices, the first plurality of obfuscated metrics.

The disclosed subject matter also relates to a system for metric obfuscation. The system may include one or more processors and a memory including instructions that, when executed by the one or more processors, cause the one or more processors to generate, at each of the periodic intervals, a seed from the plurality of metrics, wherein the generated seed changes across the periodic intervals exclusively when any of the plurality of metrics changes across the periodic intervals, initialize, at each of the periodic intervals, a pseudo-random number generator with the seed, and generate, at each of the periodic intervals, a plurality of pseudorandom numbers using the pseudorandom number generator. The instructions, when executed by the one or more processors, may further cause the one or more processors to generate, at each of the periodic intervals, a plurality of obfuscated metrics corresponding to the plurality of metrics, wherein each of the plurality of obfuscated metrics is generated at least in part based on a corresponding metric of the plurality of metrics and a corresponding pseudorandom number of the plurality of pseudorandom numbers, and provide, at each of the periodic intervals, the plurality of obfuscated metrics.

The disclosed subject matter also relates to a machine-readable medium comprising instructions stored therein, which when executed by a machine, cause the machine to perform a method for metric obfuscation that includes receiving a first dataset comprising a first plurality of metrics that relate to user demographic information. The method may further include generating a first seed from the first dataset, initializing a pseudorandom number generator with the first seed, and generating a first plurality of pseudorandom numbers using the pseudo-random number generator. The method may further include generating a first plurality of obfuscated metrics corresponding to the first plurality of metrics, wherein each of the first plurality of obfuscated metrics is generated at least in part based on a corresponding metric of the first plurality of metrics and a corresponding pseudorandom number of the plurality of pseudorandom numbers, and providing the first plurality of obfuscated metrics.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

Figure 1:
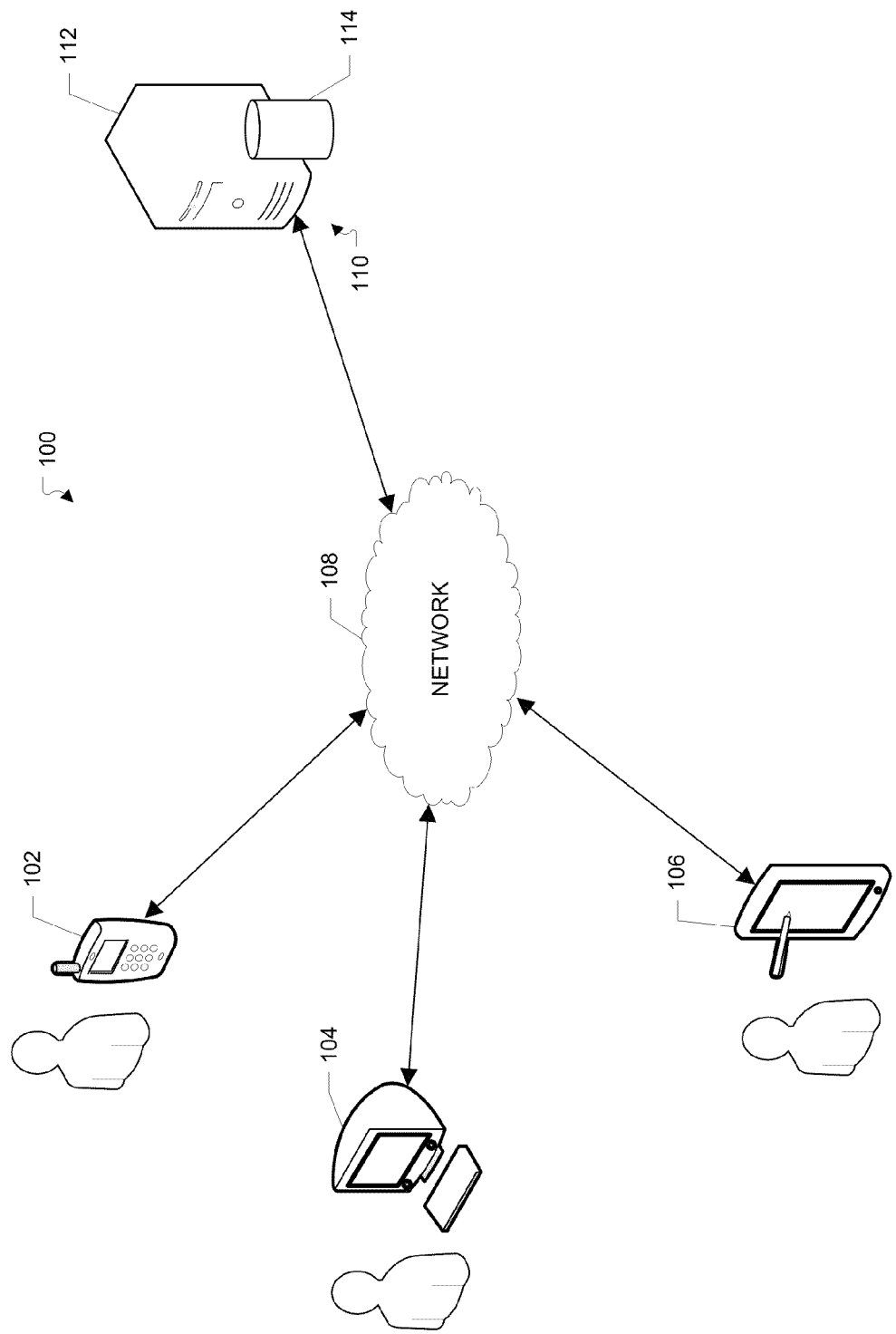
FIG. 1 illustrates an example client-server network environment that may implement a metric obfuscation system.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced without these specific details. In some instances, well-known structures and components are shown in block diagram form in order to avoid obscuring the concepts of the subject technology.

I. Overview

In online systems, such as advertising systems or social networking systems, it may be desirable to provide metrics that correspond to user demographic information at periodic intervals, such as at daily intervals. For example, it may be desirable to periodically provide an advertiser with user demographic information corresponding to click-throughs for an online advertising campaign, or it may be desirable to periodically provide a participant in a social network with demographic information corresponding to users that are associated with the participant in the social network, such as users in the social network that are following the participant. However, in view of privacy concerns it may be desirable to provide any metrics that correspond to user demographic information such that an individual user's demographic information is not determinable from the metrics. For example, if a social networking system provides a participant with a notification when a new user associates themselves with the participant, such as when a new user starts following the participant, the participant may be able to determine the demographic information of the new user by observing the user demographic metrics that changed after the notification was received.

In order to prevent an individual user's demographic information from being determinable from the metrics, it may be desirable to obfuscate the metrics such that the metrics do not directly reflect the actual underlying values. For example, a small amount of random noise may be applied to each metric at each periodic interval, such as at each daily interval. The application of random noise to a metric may cause the metric to slightly deviate above or below its actual underlying value. In this manner, it may be difficult for a person viewing the metrics to determine whether observable changes to the metrics are the result of a new user being added to the metrics, or the result of fluctuations in the random noise applied to the metrics. However, in order to prevent the metrics from fluctuating too frequently, thereby becoming nonsensical or otherwise unreliable, it may be desirable to apply the same random noise to each metric at each periodic interval until one of the underlying metrics changes, at which time the random noise applied to each metric should also change to ensure that an individual user's demographic information is not determinable from observing the changes in the metrics.

In one obfuscation system, a seed may be selected for a pseudorandom number generator or a deterministic random number generator, and the pseudorandom numbers generated by the pseudorandom number generator or deterministic random number generator may be applied as random noise to each metric in a deterministic order, thereby obfuscating the metrics. The seed may be stored in a memory such that the same seed may be re-used in the same pseudorandom number generator for each periodic interval in which the metrics are calculated. Since the use of the same seed in the same pseudorandom number generator will result in the generation of the same pattern of pseudorandom numbers by the pseudorandom number generator, the same pseudorandom number will be applied to each metric at each periodic interval. However, the obfuscation system will need to determine, at each periodic interval, whether any of the underlying metrics have changed. If any of the underlying metrics have changed at a given periodic interval, the obfuscation system may need to select a new seed for the pseudorandom number generator such that the pseudorandom number applied to each metric also changes, thereby changing the obfuscation of the metrics. Accordingly, implementing such an obfuscation system may necessitate several additional operations, e.g. an operation for determining whether any of the metrics have changed from the previous periodic interval, an operation for retrieving a seed from memory, an operation for storing a seed in memory, etc. These additional operations may impact performance, particularly in pipeline implementations.

In the subject metric obfuscation system, a value that is determinable from the metrics, and that changes exclusively when any of the individual metrics change, is used to generate the seed. In this manner, the seed will remain constant at each periodic interval if the underlying metrics remain constant, but the seed will change at any periodic interval in which any of the underlying metrics change. Since the seed can be determined at each periodic interval from the metrics themselves, the metric obfuscation system does not require any additional memory operations, e.g. the metrics themselves will have already been retrieved and/or generated, and the seed can be determined directly from the metrics. Furthermore, since the seed only changes when any of the individual metrics changes, the metric obfuscation system does not need to determine, at each periodic interval, whether any of the individual metrics have changed in order to determine whether the seed should be changed.

In one example, the subject metric obfuscation system may generate a string from the individual metrics, or from the underlying dataset, such as by concatenating all of the individual metrics into a string. The seed may be generated by computing a hash value of the string using a hashing algorithm. Since the hash value will remain constant at each periodic interval in which each of the metrics remain constant (assuming the hashing algorithm also remains constant), the metric obfuscation system will generate the same seed for each periodic interval in which each of the metrics remains constant. However, since the hash value will change at each periodic interval in which any of the individual metrics changes, the metric obfuscation system will generate a different seed for any periodic interval in which any of the individual metrics changes. Thus, the subject metric obfuscation system is able to obfuscate the metrics with substantially minimal additional processing.

II. Example Client-Server Network Environments for a Metric Obfuscation System FIG. 1 illustrates an example client-server network environment which may implement a metric obfuscation system. Network environment 100 may include a number of electronic devices 102, 104, 106 communicably connected to server 110, such as by network 108. In another example, electronic devices 102, 104, 106 may be communicably connected to one another, such as by network 108, but not communicably connected to server 110. Network 108 may be a public communication network (such as the Internet, cellular data network, dialup modems over a telephone network) or a private communications network (such as private local area network ("LAN"), leased lines). Network 108 may also include, but is not limited to, any one or more of the following network topologies, including a bus network, a star network, a ring network, a mesh network, a star-bus network, a tree or hierarchical network, and the like.

In some example embodiments, electronic devices 102, 104 and 106 can be computing devices such as laptop or desktop computers, smartphones, personal digital assistants ("PDAs"), portable media players, tablet computers, televisions or other displays with one or more processors coupled thereto and/or embedded therein, or other appropriate computing devices that can be used for displaying a web page or web application. In the example of FIG. 1, electronic device 102 is depicted as a desktop computer, electronic device 104 is depicted as a smartphone, and electronic device 106 is depicted as a tablet device.

In one example, server 110 includes one or more processing devices 112 and data store 114. The one or more processing devices 112 execute computer instructions stored in data store 114, for example, to provide obfuscated metrics to one or more of electronic devices 102, 104, 106. Data store 114 may store the computer instructions on non-transitory computer-readable medium.

In one example, server 110 may be a single computing device such as a computer server. In another example, server 110 may represent more than one computing device working together to perform the actions of a server computer (such as a cloud of computers and/or a distributed system). In another example, server 110 may be coupled with various databases, storage services, or other computing devices. Server 110 and the coupled databases, storage services, or other computing devices may be collocated, or may be disparately located.

Communications between electronic devices 102, 104, 106, and server 110 may be facilitated through the Hypertext Transfer Protocol ("HTTP") communication protocol. Other communication protocols may also be used including, for example, Extensible Messaging and Presence Protocol (XMPP) communication, for some or all communications between electronic devices 102, 104, 106 and server 110. In another example, electronic devices 102, 104, 106 may be in communication with one another without communicating with server 110.

Users interacting with electronic devices 102, 104, 106 may receive metrics from server 110, such as metrics related to, or corresponding to, user demographic information, such as gender, age, ethnicity, or any information that describes users. For example, a user interacting with one of the electronic devices 102, 104, 106 may participate in a social network and may receive metrics on a periodic basis, such as on a daily basis. The metrics may correspond to user demographics of other users in the social network that are associated with the user, e.g. other users who are "following" the user or other users who have "friended" the user. However, a user participating in a social network system may also receive independent notifications whenever another user associates or disassociates themselves from the user in the social network system.

Accordingly, if the metrics received by the user from the server 110 are not obfuscated, e.g. the metrics correspond to the actual underlying values, the user may be able to monitor variations in the metrics, upon receiving a notification that another user associated themselves with the user, in order to determine the demographic information of the other user. For example, upon receiving a notification that other user associated themselves with the user, the user may observe that the metric corresponding to the number of male users incremented by one. Accordingly, the user may be able to deduce that the other user is male. The user may be able to deduce any other demographic information corresponding to the other user in a similar manner. Thus, in order to prevent the other user's demographic information from being determinable by the user, the server 110 provides the user with obfuscated metrics, where the obfuscation changes whenever any of the underlying metric values changes. In this manner, it may be more difficult for the user to deduce the demographic information of a newly associated user upon receiving independent notification thereof, as the user may be unable to determine whether any observed variations in the metrics are a result of the newly associated user or of the change in obfuscation of the metrics.

Alternatively, or in addition, a user interacting with one of the electronic devices 102, 104, 106 may be an advertiser and may receive metrics that correspond to the demographics of users who have interacted with an online advertisement of the user. In this instance, the user may similarly have access to independent information that may allow the user to deduce the demographics of an individual user, or a group of users, based on observed variations in the metrics. Alternatively, or in addition, a user interacting with one of the electronic devices 102, 104, 106 may receive obfuscated metrics that correspond to any information for which it may not be desirable to provide the actual underlying values, e.g. because the demographic information of individual users, or groups of users, may be determinable from the metrics, or from observed variations in the metrics.

The phrase "obfuscated metric" as used herein encompasses its plain and ordinary meaning and, if not otherwise included in its plain and ordinary meaning, may also refer to any metric that includes an amount of randomness, or pseudo-randomness, that complicates the determinability of whether the obfuscated metric is equivalent to the actual underlying value represented by the metric, such as adding an amount of random, or pseudorandom, noise to the actual underlying value, where the random, or pseudo-random, noise may randomly, or pseudo-randomly, be a value of zero. Alternatively, or in addition, an "obfuscated metric" may be generated based on a corresponding metric and an amount of random noise.

In operation, at periodic intervals, such as at daily intervals, server 110 may receive one or more datasets that include metrics corresponding to user demographic information. For example, in the instance of a social network system, server 110 may receive a dataset corresponding to each participant in the social network that includes user demographic information of the other users in the social network that are associated with the participant. The server 110 may generate a seed, such as a random seed, from the dataset that changes exclusively when any of the individual metrics change. For example, the server 110 may generate a string from the individual metrics, or from the dataset, such as by concatenating all of the individual metrics into a string. The server 110 may generate a seed by computing a hash value of the string using a hashing algorithm.

The server 110 may initialize a pseudorandom number generator, or a deterministic random number generator, with the generated seed and may generate a series of pseudorandom random numbers using the initialized pseudorandom number generator or the deterministic random number generator. The server 110 may then generate an obfuscated metric for each of the metrics that corresponds to user demographic information. Alternatively, or in addition, the server 110 may generate obfuscated metrics corresponding to all of the metrics, irrespective of whether the metrics correspond to user demographic information. For example, the server 110 may generate each obfuscated metric based at least in part on the corresponding metric and one of the series of pseudorandom numbers. The server 110 may use the pseudorandom number to determine an amount noise that is applied to the underlying metric value to generate the obfuscated metric. For example, if the pseudorandom number falls within a first range, a value of one may be added to the actual metric to generate the obfuscated metric, if the pseudorandom number falls within a second range, a value of one may be subtracted from the actual metric to generate the obfuscated metric, and if the pseudorandom number does not fall within the first or second ranges, a value of zero may be added to the actual metric to generate the obfuscated metric. Thus, in some random, or pseudo-random, instances the obfuscated metric may be equivalent to the actual underlying value of the corresponding metric. However, since the obfuscated metric will only be equivalent to the actual underlying value of the corresponding metric in random, or pseudo-random, instances, and then only rarely, a user may be unable to determine with certainty whether any given obfuscated metric is equivalent to the actual underlying value.

Since the generated string of metrics, and consequently the hash of the generated string of metrics that is used as the seed, will remain constant when the individual metrics remain constant across the periodic intervals, the series of pseudorandom numbers generated by the pseudorandom number generator will also remain constant across the periodic intervals when the individual metrics, and consequently the seed, remain constant across the periodic intervals. Accordingly, the server 110 may select a pseudorandom number corresponding to each metric in a deterministic order from the series of pseudorandom numbers such that the same pseudorandom number is selected for each metric across each periodic interval at least when the series of pseudorandom numbers remains constant across each periodic interval. In this manner each pseudorandom number used to generate the random noise for each metric will remain constant across the periodic intervals at least when the metrics remain constant across the periodic intervals.

Conversely, if any of the individual metrics changes across the periodic intervals, then the generated string, the hash of the generated string used as the seed, and consequently the series of pseudorandom numbers generated by the pseudorandom number generator, will also change across the periodic intervals. In this manner each pseudorandom number used to generate the random noise for each metric will change across the periodic intervals when any of the individual metrics change across the periodic intervals.

After generating an obfuscated metric corresponding to each of the metrics of the dataset, the server 110 may provide the obfuscated metrics to a user interacting with one of the electronic devices 102, 104, 106. For example, the server 110 may provide a graphical display that includes a graphical indicator corresponding to each of the obfuscated metrics.

III. Example Processes for a Metric Obfuscation System

Figure 2:
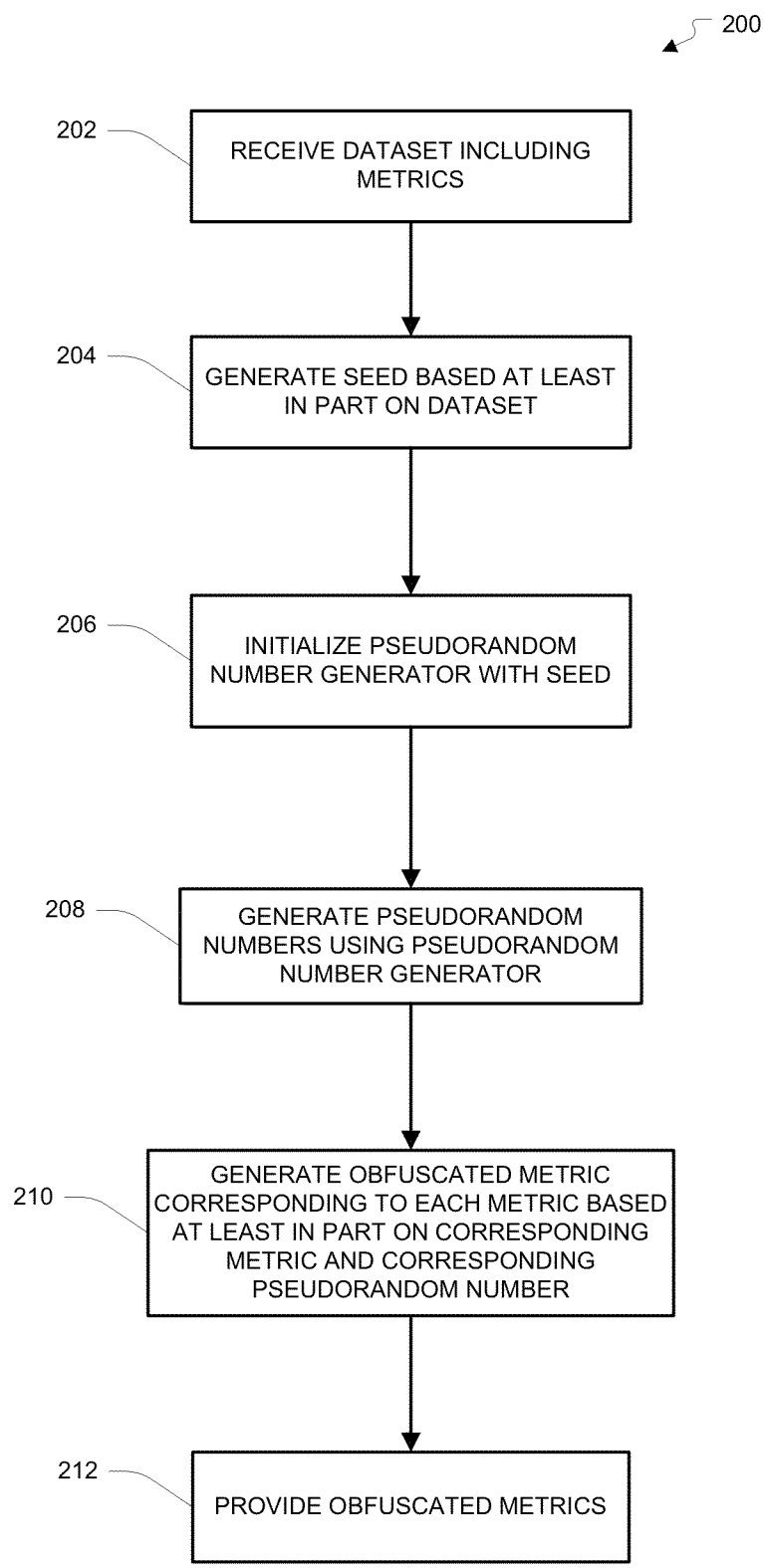
FIG. 2 illustrates a flow diagram of an example process for a metric obfuscation system.

FIG. 2 illustrates a flow diagram of an example process 200 for a metric obfuscation system. For explanatory purposes, example process 200 is described herein with reference to the example network environment 100 of FIG. 1; however, example process 200 is not limited to the example network environment 100 of FIG. 1. Further for explanatory purposes, the blocks of example process 200 are described herein as occurring in serial, or linearly. However, multiple blocks of example process 200 may occur in parallel.

In block 202, a computing device, such as server 110, receives a dataset that includes one or more metrics, such as metrics corresponding to user demographic information. For example, in the instance of a social network system, the demographic information may correspond to users associated with a participant in a social network system. The server 110 may receive the dataset including the metrics at periodic intervals, such as at daily intervals. In this manner, a participant in the social network system may be provided with updated metrics on a periodic basis, such as on a daily basis. In one example, the dataset may correspond to an individual participant in a social network and the server 110 may receive datasets that correspond to each of the participants in the social network at each periodic interval. In this instance, the server 110 may process the datasets in parallel, such as through pipeline processing, and therefore the server 110 may perform multiple blocks of FIG. 2 simultaneously and/or the server 110 may perform the same block of FIG. 2 simultaneously for multiple datasets.

In block 204, the server 110 generates a seed based at least in part on the received dataset. The server 110 generates the seed such that the seed remains constant from one periodic interval to the next when the individual metrics of the dataset remain constant from one periodic interval to the next, and such that the seed changes from one periodic interval to the next when any of the individual metrics of the dataset change from one interval to the next. For example, the server 110 may generate a string from the dataset, such as by concatenating the dataset, or concatenating the metrics of the dataset, and the server 110 may generate a seed by applying the string to a hashing algorithm, e.g. by generating a hash of the string. Since the string will remain constant from one periodic interval to the next when the metrics remain constant, the seed will also remain constant from one periodic interval to the next when the metrics remain constant, so long as the hashing algorithm remains constant. Conversely, since the string will change from one periodic interval to the next when any of the individual metrics change from one periodic interval to the next, the seed will also change from one periodic interval to the next when any of the individual metrics change.

In block 206, the server 110 initializes a pseudorandom number generator with the generated seed. In block 208, the server 110 generates a series of pseudorandom numbers using the pseudorandom number generator that is initialized with the seed. Since the same pseudorandom number generator will generate the same series of random numbers when initialized with the same seed, the series of random numbers generated by the pseudorandom number generator will remain constant from one periodic interval to the next when the seed remains constant from one periodic interval to the next, e.g. when the metrics remain constant from one periodic interval to the next. Conversely, since the same pseudorandom number generator will generate a different series of pseudorandom numbers when initialized with a different seed, the pseudorandom number generator will generate a different series of pseudorandom numbers from one periodic interval to the next when the seed changes from one periodic interval to the next, e.g. when any of the individual metrics changes from one periodic interval to the next.

In block 210, the server 110 generates an obfuscated metric corresponding to each metric of the dataset. Each obfuscated metric may be generated based at least in part on the corresponding metric and one of the series of pseudorandom numbers. In one example, the server 110 may use a different pseudorandom number of the series of pseudorandom numbers for generating each obfuscated metric. For example, the server 110 may order the metrics in a deterministic fashion, e.g. a reproducible fashion, and the server 110 may apply the pseudorandom numbers to the metrics in a linear fashion, e.g. the server 110 may use the first pseudorandom number of the series to generate the obfuscated metric corresponding to the first metric, etc. In other words, if each of the metrics is linearly associated with a corresponding index value, e.g. 0, 1, 2, etc. and each pseudorandom number is linearly associated with a corresponding index value, e.g. 0, 1, 2, etc., the server 110 would use the pseudorandom number associated with an index value of 0 to generate the obfuscated metric corresponding to the metric associated with the index value of 0, etc. Alternatively, or in addition, the pseudorandom number used to generate the obfuscated metric corresponding to each metric may be selected by the server 110 in any manner that is reproducible such that the server 110 can select the same pseudorandom number to generate the obfuscated metric for the same corresponding metric at each periodic interval in which the seed remains constant.

In block 212, the server 110 provides the obfuscated metrics, such as to a user interacting with one of the electronic devices 102, 104, 106. For example, the server 110 may provide a graphical display that includes a graphical indicator corresponding to each of the obfuscated metrics. The server 110 may provide the obfuscated metrics to the user such that the values of the underlying metrics are not determinable from the obfuscated metrics. The server 110 may provide the user with updated obfuscated metrics at each periodic interval. Alternatively, the server 110 may only provide the user with updated obfuscated metrics at periodic intervals in which at least one of the underlying individual metrics changes.

Figure 3:
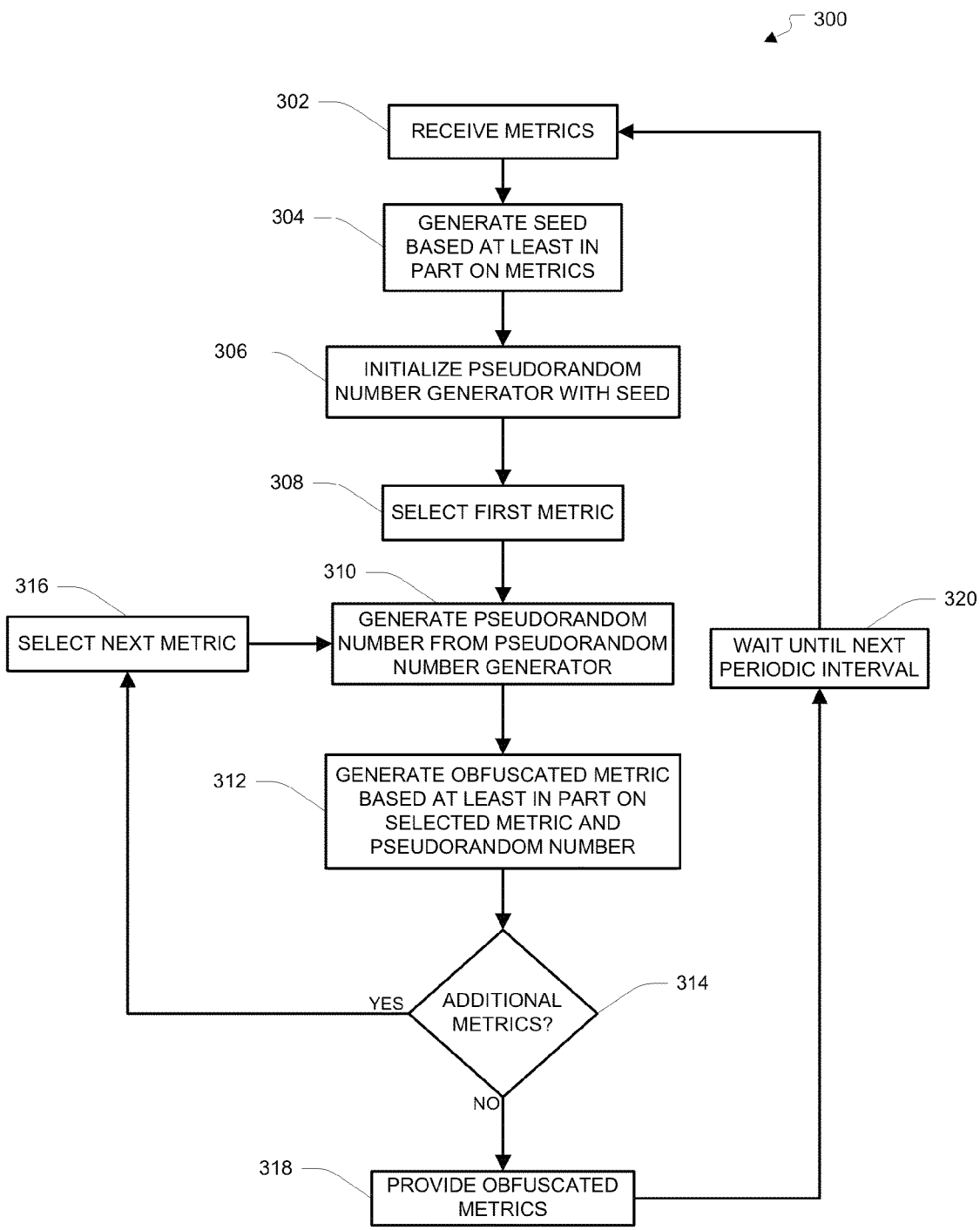
FIG. 3 illustrates a flow diagram of an example process for a metric obfuscation system.

FIG. 3 illustrates a flow diagram of an example process 300 for a metric obfuscation system. For explanatory purposes, example process 300 is described herein with reference to the example network environment 100 of FIG. 1; however, example process 300 is not limited to the example network environment 100 of FIG. 1. Further for explanatory purposes, the blocks of example process 300 are described herein as occurring in serial, or linearly. However, multiple blocks of example process 300 may occur in parallel.

In block 302, a computing device, such as server 110, receives metrics, such as metrics corresponding to user demographic information of users associated with a participant in a social network system. In block 304, the server 110 generates a seed based at least in part on the received metrics. The server 110 generates the seed such that the seed remains constant from one periodic interval to the next when the individual metrics of the dataset remain constant from one periodic interval to the next, and such that the seed changes from one periodic interval to the next when any of the individual metrics of the dataset change from one periodic interval to the next. For example, the server 110 may generate a string from the metrics, such as by concatenating the metrics into a string, and the server 110 may generate a seed by applying the string to a hashing algorithm, e.g. by generating a hash of the string.

In block 308, the server 110 initializes a pseudorandom number generator with the generated seed. In block 310, the server 110 selects a first metric from the received metrics. The server 110 may select the first metric in a deterministic fashion such that the server 110 may select the same first metric at each periodic interval. For example, the server 110 may order the metrics, such as alphabetically based on descriptors, or other indicators, associated with each metric. In this manner, the server 110 can select the same metric first at each periodic interval, and the server 110 can select subsequent metrics in the same order at each periodic interval.

In block 310, the server 110 generates a pseudorandom number using the pseudorandom number generator. In block 312, the server 110 generates an obfuscated metric corresponding to the selected metric based at least in part on the selected metric and the pseudorandom number. For example, the server 110 may add a value X to the metric as random noise, where X is any value, subtract the value X from the metric as random noise, or add the value zero to the metric, depending upon the value of the pseudorandom number, to generate the obfuscated metric. For example, the pseudorandom numbers generated by the pseudorandom number generator may be limited to numbers between one and one-hundred, inclusively. In this instance, if a generated pseudorandom number falls in-between the inclusive range of one and thirty-three, the value X, such as one, may be added to the corresponding metric as random noise, if the pseudorandom number falls in-between the inclusive range of thirty-four and sixty-six, the value X, such as one, may be subtracted from the corresponding metric as random noise, and if the pseudorandom number falls in-between the inclusive range of sixty-seven to one-hundred, the value zero may be added to the corresponding metric. Alternatively, or in addition, any mechanism may be used to apply the pseudorandom number to the corresponding metric as random noise to generate the corresponding obfuscated metric, so long as the mechanism is reproducible across each of the periodic intervals.

In block 314, the server 110 determines whether there are any additional metrics for which an obfuscated metric has not been generated. If, in block 314, the server 110 determines that there is an additional metric for which an obfuscated metric has not been generated, the server 110 moves to block 316. In block 316, the server 110 selects the next metric for which an obfuscated metric has not been generated, and the server 110 repeats blocks 310-312 to generate the obfuscated metric corresponding to the metric. If, in block 314, the server 110 determines that an obfuscated metric has been generated for each of the metrics, the server 110 moves to block 318.

In block 318, the server 110 provides the obfuscated metrics, such as to a user interacting with one of the electronic devices 102, 104, 106. For example, the server 110 may provide a graphical display that includes a graphical indicator corresponding to each of the obfuscated metrics. The server 110 then moves to block 320. The server 110 waits at block 320 until the next periodic interval. At the next periodic interval, the server 110 returns to block 302, where the server 110 receives a set of metrics for the next periodic interval, and the server 110 repeats blocks 304-318 for the received set of metrics. If each of the individual metrics remains constant from the first interval to the next interval, the seed will remain constant and the series of pseudorandom numbers will remain constant, and consequently the obfuscated metrics will remain constant. However, if any of the individual metrics changes from the first interval to the next interval, then the seed will change, the series of pseudorandom numbers will change, and consequently the obfuscated metrics will change.

IV. Example User Interfaces for a Metric Obfuscation System

Figure 4:
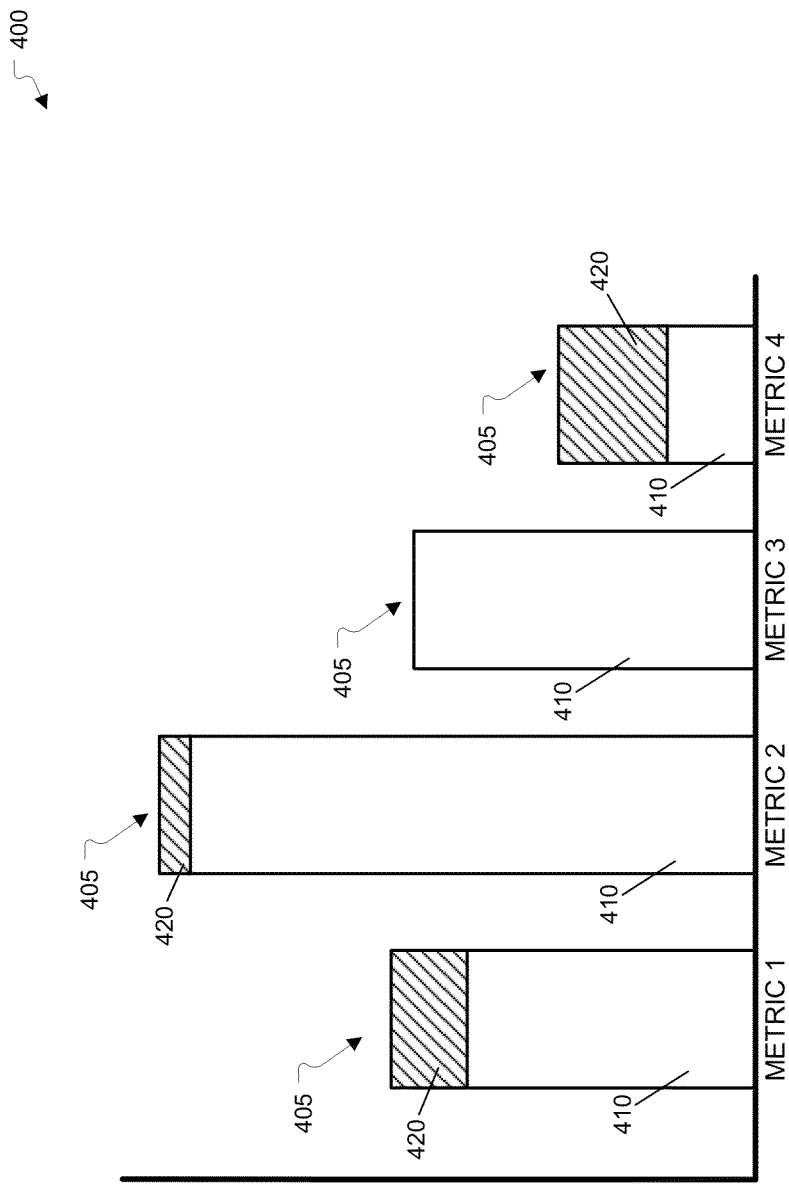
FIG. 4 illustrates an example screenshot of a user interface for a metric obfuscation system.

FIG. 4 illustrates an example user interface 400 for a metric obfuscation system. The user interface 400 includes graphical representations of obfuscated metrics 405. The graphical representations of the obfuscated metrics 405 may include underlying metric values 410 and noise 420 applied to the underlying metric values 410. For explanatory purposes, the noise 420 is shaded in the user interface 400 to illustrate the amount of noise 420 applied to each of the underlying metric values 410 to generate the obfuscated metrics. However, in operation (e.g., presentation to the end-users) the graphical representations of the obfuscated metrics 405 will be displayed uniformly such that the amount of noise 420 applied to the underlying metric values 410 is not determinable from the graphical representations of the obfuscated metrics 405.

In operation, the server 110 may generate random, or pseudorandom, noise 420 that is applied to each of the underlying metric values 410 to generate the obfuscated metrics 405. For example, the noise 420 applied to each underlying metric value 410 may be determined based on a generated series of pseudorandom numbers. In one example, different ranges of pseudorandom numbers may correspond to different amounts of noise, including no noise, and the range that a given pseudorandom number falls into may indicate the amount of noise 420 to be applied to the corresponding underlying metric value 410 to generate the obfuscated metric 405.

As shown, in FIG. 4, the amount of noise 420 applied to each underlying metric value 410 may vary randomly, or pseudorandomly, from one metric to the next metric, and in some instances no noise may be applied such that the obfuscated metric 405 is equivalent to the underlying metric value 410. Although FIG. 4 only illustrates noise 420 that is added to the underlying metric values 410 to generate the obfuscated metrics 405, noise 420 may also be subtracted from one or more of the underlying metric values 410 to generate the obfuscated metrics 405. The amount of noise, and whether the noise is added or subtracted to the corresponding underlying metric value 410, may be determined based on, e.g. the range of numbers that the corresponding pseudorandom number falls into.

V. Example Systems for Metric Obfuscation

Figure 5:
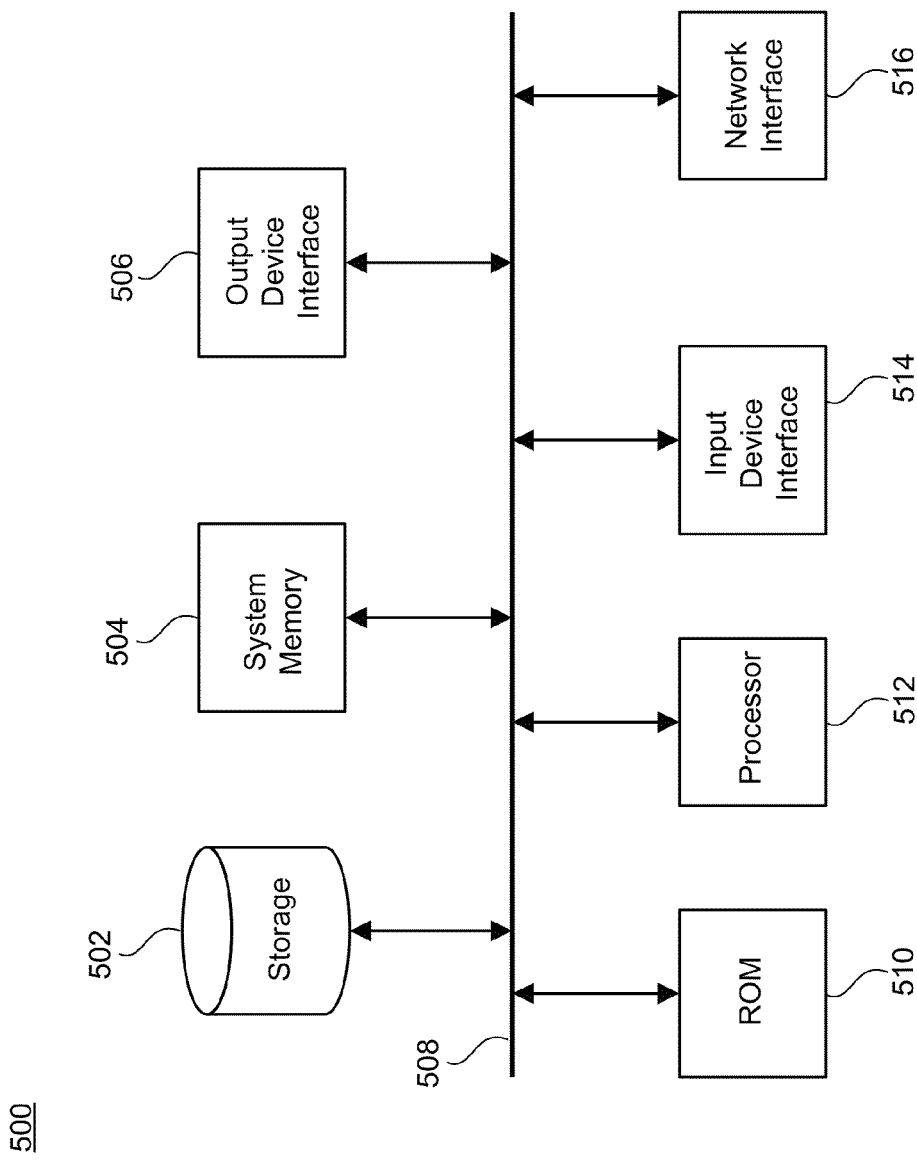
FIG. 5 conceptually illustrates an electronic system with which some implementations of the subject technology may be implemented.

FIG. 5 conceptually illustrates an electronic system with which some implementations of the subject technology are implemented. Electronic system 500 can be a server, computer, phone, PDA, a tablet computer, a television with one or more processors embedded therein or coupled thereto, or generally any electronic device. Such an electronic system includes various types of computer readable media and interfaces for various other types of computer readable media. Electronic system 500 includes a bus 508, processing unit(s) 512, a system memory 504, a read-only memory (ROM) 510, a permanent storage device 502, an input device interface 514, an output device interface 506, and a network interface 516.

Bus 508 collectively represents all system, peripheral, and chipset buses that communicatively connect the numerous internal devices of electronic system 500. For instance, bus 508 communicatively connects processing unit(s) 512 with ROM 510, system memory 504, and permanent storage device 502.

From these various memory units, processing unit(s) 512 retrieves instructions to execute and data to process in order to execute the processes of the subject disclosure. The processing unit(s) can be a single processor or a multi-core processor in different implementations.

ROM 510 stores static data and instructions that are needed by processing unit(s) 512 and other modules of the electronic system. Permanent storage device 502, on the other hand, is a read-and-write memory device. This device is a non-volatile memory unit that stores instructions and data even when electronic system 500 is off. Some implementations of the subject disclosure use a mass-storage device (such as a magnetic or optical disk and its corresponding disk drive) as permanent storage device 502.

Other implementations use a removable storage device (such as a floppy disk, flash drive, and its corresponding disk drive) as permanent storage device 502. Like permanent storage device 502, system memory 504 is a read-and-write memory device. However, unlike storage device 502, system memory 504 is a volatile read-and-write memory, such a random access memory. System memory 504 stores some of the instructions and data that the processor needs at runtime. In some implementations, the processes of the subject disclosure are stored in system memory 504, permanent storage device 502, and/or ROM 510. For example, the various memory units may include instructions for metric obfuscation in accordance with some implementations. From these various memory units, processing unit(s) 512 retrieves instructions to execute and data to process in order to execute the processes of some implementations.

Bus 508 also connects to input and output device interfaces 514 and 506. Input device interface 514 enables the user to communicate information and select commands to the electronic system. Input devices used with input device interface 514 include, for example, alphanumeric keyboards and pointing devices (also called "cursor control devices"). Output device interfaces 506 enables, for example, the display of images generated by the electronic system 500. Output devices used with output device interface 506 include, for example, printers and display devices, such as cathode ray tubes (CRT) or liquid crystal displays (LCD). Some implementations include devices such as a touchscreen that functions as both input and output devices.

Finally, as shown in FIG. 5, bus 508 also couples electronic system 500 to a network (not shown) through a network interface 516. In this manner, the computer can be a part of a network of computers (such as a local area network ("LAN"), a wide area network ("WAN"), or an Intranet, or a network of networks, such as the Internet. Any or all components of electronic system 500 can be used in conjunction with the subject disclosure.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, ultra density optical discs, any other optical or magnetic media, and floppy disks. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms "display" or "displaying" means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device, such as a CRT (cathode ray tube) or LCD (liquid crystal display) monitor, for displaying information to the user and a keyboard and a pointing device, such as a mouse or a trackball, by which the user can provide input to the computer. Other kinds of devices can be used to provide for interaction with a user as well; for example, feedback provided to the user can be any form of sensory feedback, such as visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, such as a data server, or that includes a middleware component, such as an application server, or that includes a front end component, such as a client computer having a graphical user interface or a Web browser through which a user can interact with an implementation of the subject matter described in this specification, or any combination of one or more such back end, middleware, or front end components. The components of the system can be interconnected by any form or medium of digital data communication, such as a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some implementations, multiple software aspects of the subject disclosure can be implemented as sub-parts of a larger program while remaining distinct software aspects of the subject disclosure. In some implementations, multiple software aspects can also be implemented as separate programs. Finally, any combination of separate programs that together implement a software aspect described here is within the scope of the subject disclosure. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Some of the blocks may be performed simultaneously. For example, in certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

The term website, as used herein, may include any aspect of a website, including one or more web pages, one or more servers used to host or store web related content, and the like. Accordingly, the term website may be used interchangeably with the terms web page and server. The predicate words "configured to", "operable to", and "programmed to" do not imply any particular tangible or intangible modification of a subject, but, rather, are intended to be used interchangeably. For example, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

The word "example" is used herein to mean "serving as an example or illustration." Any aspect or design described herein as "example" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for." Furthermore, to the extent that the term "include," "have," or the like is used in the description or the claims, such term is intended to be inclusive in a manner similar to the term "comprise" as "comprise" is interpreted when employed as a transitional word in a claim.

What is claimed is:

1. A computer-implemented method for metric obfuscation, the method comprising:
   receiving, using one or more computing devices and at periodic intervals, a plurality of metrics related to user demographic information, wherein the periodic intervals are defined intervals;
   generating, using the one or more computing devices and at each of the periodic intervals, a seed based on the plurality of metrics, wherein the seed changes across the periodic intervals when at least one of the plurality of metrics changes across the periodic intervals;
   initializing, using the one or more computing devices and at each of the periodic intervals, a pseudorandom number generator with the seed;
   generating, using the one or more computing devices and at each of the periodic intervals, a plurality of pseudorandom numbers using the pseudorandom number generator, wherein the plurality of pseudorandom numbers include a corresponding pseudorandom number for each of the metrics of the plurality of metrics and wherein the plurality of pseudorandom numbers change across the periodic intervals when the seed changes across the periodic intervals;
   generating, using the one or more computing devices and at each of the periodic intervals, a plurality of obfuscated metrics corresponding to each of the plurality of metrics, wherein each obfuscated metric of the plurality of obfuscated metrics is generated based on the corresponding metric of the plurality of metrics and the corresponding pseudorandom number of the plurality of pseudorandom numbers; and
   providing, using the one or more computing devices and at each of the periodic intervals, the plurality of obfuscated metrics.

2. The method of claim 1, wherein the seed is constant across the periodic intervals when the plurality of metrics are constant across the periodic intervals.

3. The method of claim 1, wherein the generating, using the one or more computing devices and at each periodic interval, the seed based on the plurality of metrics comprises:
   concatenating, using the one or more computing devices, each of the plurality of metrics to generate a concatenated metric value; and
   generating, using the one or more computing devices, the seed by applying a hashing algorithm to the concatenated metric value.

4. The method of claim 1, wherein each corresponding pseudorandom number of the plurality of pseudorandom numbers used to generate each of the plurality of obfuscated metrics is chosen in a deterministic order.

5. The method of claim 1, wherein the user demographic information corresponds to a plurality of users associated with a participant in a social network.

6. The method of claim 5, further comprising:
   providing, using the one or more computing devices, an independent notification to the participant when a new user is associated with the participant in the social network or when one of the plurality of users is disassociated from the participant in the social network.

7. A computer-implemented method for metric obfuscation, the method comprising:
   receiving, using one or more computing devices, a first dataset comprising a first plurality of metrics;
   generating, using the one or more computing devices, a first seed based on the first dataset;
   initializing, using the one or more computing devices, a pseudorandom number generator with the first seed;
   generating, using the one or more computing devices, a first plurality of pseudorandom numbers using the pseudorandom number generator, wherein the first plurality of pseudorandom numbers include a corresponding pseudorandom number for each of the metrics of the first plurality of metrics;

generating, using the one or more computing devices, a first plurality of obfuscated metrics corresponding to the first plurality of metrics, wherein each of the first plurality of obfuscated metrics is generated based on the corresponding metric of the first plurality of metrics and the corresponding pseudorandom number of the first plurality of pseudorandom numbers; and providing, using the one or more computing devices, the first plurality of obfuscated metrics;

receiving, at a fixed interval from receiving the first dataset, using the one or more computing devices, a second dataset comprising a second plurality of metrics that correspond to the user demographic information;

generating, using the one or more computing devices, a second seed based on the second dataset, wherein the second seed differs from the first seed when at least one metric of the second plurality of metrics differs from the corresponding metric of the first plurality of metrics;

initializing, using the one or more computing devices, the pseudorandom number generator with the second seed;

generating, using the one or more computing devices, a second plurality of pseudorandom numbers from the pseudorandom number generator, wherein the second plurality of pseudorandom numbers include a corresponding pseudorandom number for each of the metrics of the second plurality of metrics and wherein the second plurality of pseudorandom numbers are different from the first plurality of pseudorandom numbers when the second seed is different from the first seed;

generating, using the one or more computing devices, a second plurality of obfuscated metrics corresponding to the second plurality of metrics, wherein each of the second plurality of obfuscated metrics is generated based on a corresponding metric of the second plurality of metrics and the corresponding pseudorandom number of the plurality of pseudorandom numbers; and providing, using the one or more computing devices, the second plurality of obfuscated metrics.

8. The method of claim 7, wherein the generating, using the one or more computing devices, the first seed based on the first dataset comprises:

generating, using the one or more computing devices, a first string representative of the first dataset; and generating, using the one or more computing devices, the first seed by applying a hashing algorithm to the first string.

9. The method of claim 7, wherein the first plurality of metrics correspond to user demographic information.

10. The method of claim 9, wherein the user demographic information corresponds to a plurality of users associated with a participant in a social network.

11. The method of claim 10, further comprising:

providing, using the one or more computing devices, an independent notification to the participant when a new user is associated with the participant in the social network or when one of the plurality of users is disassociated from the participant in the social network.

12. The method of claim 7, wherein the second seed is the same as different than the first seed when the second plurality of metrics are not different than the first plurality of metrics.

13. The method of claim 7, wherein the generating, using the one or more computing devices, the second seed based on the second dataset comprises:

generating, using the one or more computing devices, a second string representative of the second dataset; and generating, using the one or more computing devices, the second seed by applying the hashing algorithm to the second string.

14. A system, comprising:

one or more processors; and a memory including instructions that, when executed by the one or more processors, cause the one or more processors to:

generate a seed based on a plurality of metrics related to user demographic information received at periodic intervals, at each of the periodic intervals, wherein the seed changes across the periodic intervals when any of the plurality of metrics changes across the periodic intervals;

initialize, at each of the periodic intervals, a pseudorandom number generator with the seed;

generate, at each of the periodic intervals, a plurality of pseudorandom numbers using the pseudorandom number generator, wherein the plurality of pseudorandom numbers include a corresponding pseudorandom number for each of the metrics of the plurality of metrics and wherein the plurality of pseudorandom numbers change across the periodic intervals when the seed changes across the periodic intervals;

generate, at each of the periodic intervals, a plurality of obfuscated metrics corresponding to each of the plurality of metrics, wherein each of the plurality of obfuscated metrics is generated based on the corresponding metric of the plurality of metrics and the corresponding pseudorandom number of the plurality of pseudorandom numbers; and provide, at each of the periodic intervals, the plurality of obfuscated metrics.

15. The system of claim 14, wherein the seed is constant across the periodic intervals when the plurality of metrics are constant across the periodic intervals.

16. The system of claim 14, wherein the instructions that, when executed by the one or more processors, further cause the one or more processors to:

concatenate each of the plurality of metrics to generate a concatenated metric value; and generate the seed by applying a hashing algorithm to the concatenated metric value.

17. A non-transitory machine-readable medium comprising instructions stored therein, which when executed by a machine, cause the machine to perform a method for metric obfuscation, the method comprising:

receiving a first dataset comprising a first plurality of metrics that relate to user demographic information;

generating a first seed based on the first dataset;

initializing a pseudorandom number generator with the first seed;

generating a first plurality of pseudorandom numbers using the pseudorandom number generator, wherein the first plurality of pseudorandom numbers include a corresponding pseudorandom number for each of the metrics of the first plurality of metrics;

generating a first plurality of obfuscated metrics corresponding to the first plurality of metrics, wherein each of the first plurality of obfuscated metrics is generated based on a corresponding metric of the first plurality of metrics and a corresponding pseudorandom number of the plurality of pseudorandom numbers; and providing the first plurality of obfuscated metrics;

receiving, at a fixed interval from receiving the first dataset, a second dataset comprising a second plurality of metrics that relate to the user demographic information;

generating a second seed based on the second dataset, wherein the second seed is different from the first seed when at least one metric of the second plurality of metrics is different from the corresponding metric of the first plurality of metrics;

initializing the pseudorandom number generator with the second seed;

generating a second plurality of pseudorandom numbers from the pseudorandom number generator;

generating a second plurality of obfuscated metrics corresponding to the second plurality of metrics, wherein each of the second plurality of obfuscated metrics is generated based on a corresponding metric of the second plurality of metrics and the corresponding pseudorandom number of the plurality of pseudorandom numbers and wherein the second plurality of pseudorandom numbers are different from the first plurality of pseudorandom numbers when the second seed is different from the first seed; and providing, using the one or more computing devices, the second plurality of obfuscated metrics.

18. The machine readable medium of claim 17, wherein the second seed is the same as the first seed when the second plurality of metrics are the same as the first plurality of metrics.

* * * * *